United States Patent
Rasmussen et al.

(10) Patent No.: US 6,606,395 B1
(45) Date of Patent: Aug. 12, 2003

(54) METHOD TO ALLOW AUTOMATED IMAGE QUALITY ANALYSIS OF ARBITRARY TEST PATTERNS

(75) Inventors: D. Rene Rasmussen, Pittsford, NY (US); Edul N. Dalal, Webster, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/450,182

(22) Filed: Nov. 29, 1999

(51) Int. Cl.[7] .................................................. G06K 9/00
(52) U.S. Cl. ........................ 382/112; 358/2.1; 358/3.1; 358/3.26; 358/3.27; 358/518; 382/165; 382/167; 382/181; 382/287
(58) Field of Search .......................... 382/181, 278–279, 382/112, 287, 161–167; 399/8; 358/1.15, 406, 518, 2.1, 3.1, 3.26, 3.27

(56) References Cited

U.S. PATENT DOCUMENTS

| | | |
|---|---|---|
| 4,071,911 A | 1/1978 | Mazur |
| 4,086,434 A | 4/1978 | Bocchi |
| 4,583,834 A | 4/1986 | Seko et al. |
| 5,038,319 A | 8/1991 | Carter et al. |
| 5,057,866 A | 10/1991 | Hill, Jr. et al. |
| 5,084,875 A | 1/1992 | Weinberger et al. |
| 5,365,310 A | 11/1994 | Jenkins et al. |
| 5,510,876 A | 4/1996 | Hayashi et al. |
| 5,510,896 A | 4/1996 | Wafler |
| 5,612,902 A | 3/1997 | Stokes |
| 5,619,307 A | 4/1997 | Machino et al. |
| 5,642,202 A | 6/1997 | Williams et al. |
| 5,680,541 A | 10/1997 | Kurosu et al. |
| 5,694,528 A | 12/1997 | Hube |
| 5,748,221 A | 5/1998 | Castelli et al. |
| 5,859,920 A * | 1/1999 | Daly et al. .................... 382/115 |
| 5,884,118 A | 3/1999 | Mestha et al. |
| 6,023,525 A | 2/2000 | Cass |
| 6,023,595 A | 2/2000 | Suzuki et al. |
| 6,101,272 A * | 8/2000 | Noguchi ..................... 382/167 |
| 6,275,600 B1 * | 8/2001 | Banker et al. ............... 382/112 |
| 6,435,642 B1 * | 8/2002 | Jackson et al. ................ 347/19 |
| 6,459,825 B1 * | 10/2002 | Lippincott ................... 382/312 |
| 6,466,329 B1 * | 10/2002 | Mukai ......................... 358/1.15 |
| 6,473,531 B1 * | 10/2002 | Kunitake ..................... 382/239 |
| 6,522,430 B1 * | 2/2003 | Dalal et al. .................. 358/406 |
| 6,529,616 B1 * | 3/2003 | Rasmussen et al. ......... 382/112 |

FOREIGN PATENT DOCUMENTS

EP       0 854 632 A2    7/1998

OTHER PUBLICATIONS

Remote Diagnostics Systems, Paul F. Morgan, Xerox Disclosure Journal, vol. 3, No. 3, May/Jun. 1978, pp. 191–192x.
Event–based architecture for real–time fault diagnosis, Real Time Fault Monitoring of Industrial Processes, A.D. Poulidzos & G.S. Staverakakis, Kluwer Academic Publishers, 1994, pp. 284–287.

(List continued on next page.)

*Primary Examiner*—Bhavesh M. Mehta
*Assistant Examiner*—Gregory Desire
(74) *Attorney, Agent, or Firm*—Oliff & Berridge, PLC

(57) ABSTRACT

An image quality analysis system is provided that can determine various aspects of image quality easily and with minimal user involvement and minimal user expertise. The system uses a scanner, either a stand-alone or part of a multi-function printer/scanner/copier, to scan a printed test pattern, and then perform a series of analyses on the scanned image using an image quality analysis module that may be built into the image output device being tested, or provided as a stand-alone component that can receive the output from the scanner. There are often a number of different test patterns that would be used depending on which print quality issues are being tested. By encoding each test pattern with a coded identification label, not only can the particular test pattern be identified, but the analysis to be performed can also be determined from the corresponding script when the printed test pattern is scanned and subsequently decoded. Particularly suitable decoders are OCR and barcode readers. Such identification labels and/or scripts can also be used to identify a particular machine that is being tested and other relevant information.

20 Claims, 7 Drawing Sheets

OTHER PUBLICATIONS

Fault Diagnosis in Dynamic Systems Using Analytical and Knowledge–based Redundancy—A Survey and Some New Results, Paul M. Frank, Automatica, vol. 26, 90 International Federation of Automatic Control, 1990, pp. 459–474.

Combining Expert System and Analytical Redundancy Concepts for Fault–Tolerant Flight Control, David A. Handelman and Robert F. Stengel, Princeton University, J. Guidance, vol. 12, No. 1, Jan.–Feb. 1989, pp. 39–45.

* cited by examiner

```
TPC       IQAF-TP2      Version 1
          4#
LOCATOR1  20.17    22.9
LOCATOR2  146.65   22.9
LOCATOR3  146.65   213.6
LOCATOR4  20.17    213.6
          30
GLOBAL    TEMPLATE  IQAF-TP2-v1.template.xls
#T#1      Mottle
GLOBAL    IMAGETYP  i8RGB
GLOBAL    MARGINX       2
GLOBAL    MARGINY       2
T1-C      77.46    89.85   33   20    MM=Mottle CC=RGB2Y>
T1-M      77.46    111.24  33   20    MM=Mottle CC=RGB2Y>
T1-Y      77.46    132.62  33   20    MM=Mottle CC=RGB2Y>
T1-K      77.46    154     33   20    MM=Mottle CC=RGB2Y>
T1-R      111.87   89.85   33   20    MM=Mottle CC=RGB2Y>
T1-G      111.87   111.24  33   20    MM=Mottle CC=RGB2Y>
T1-B      111.87   132.62  33   20    MM=Mottle CC=RGB2Y>
T1-CMYK   111.87   154     33   20    MM=Mottle CC=RGB2Y>
#T#6      Graininess
T6-1      67.14    -15     20   20    MM=AFGra CC=RGB2Y>
T6-2      87.14    -15     20   20    MM=AFGra CC=RGB2Y>
T6-3      67.14    5       20   20    MM=AFGra CC=RGB2Y>
T6-4      87.14    5       20   20    MM=AFGra CC=RGB2Y>
T6-5      67.14    25      20   20    MM=AFGra CC=RGB2Y>
T6-6      87.14    25      20   20    MM=AFGra CC=RGB2Y>
T6-7      67.14    45      20   20    MM=AFGra CC=RGB2Y>
T6-8      87.14    45      20   20    MM=AFGra CC=RGB2Y>
T6-9      67.14    65      20   20    MM=AFGra CC=RGB2Y>
T6-10     87.14    65      20   20    MM=AFGra CC=RGB2Y>
#T#28     Color Registration
GLOBAL    IMAGETYP  i8RGB
GLOBAL    MARGINX       0
GLOBAL    MARGINY       0
T28-H-1   -16.42   -18.71  13   8              MM=ColorReg>
T28-V-1   -13.92   -10.94  8    13    RR=270>MM=ColorReg>
T28-H-2   148.66   -18.71  13   8              MM=ColorReg>
T28-V-2   151.16   -10.94  8    13    RR=270>MM=ColorReg>
T28-H-3   -16.42   158.6   13   8              MM=ColorReg>
T28-V-3   -13.92   166.37  8    13    RR=270>MM=ColorReg>
T28-H-4   148.7    158.6   13   8              MM=ColorReg>
T28-V-4   151.2    166.37  8    13    RR=270>MM=ColorReg>
T28-H-5   61.04    90.81   13   8              MM=ColorReg>
T28-V-5   63.54    98.58   8    13    RR=270>MM=ColorReg>
#ITP1#1   Banding
ITP1#1-V  27.7     -14.5   20   230   RR=270>MM=Bandin CC=RGB2XYZ>
ITP1#1-H  -20      200.6   173  20             MM=Bandin CC=RGB2XYZ>
```

*FIG. 7*

METHOD TO ALLOW AUTOMATED IMAGE QUALITY ANALYSIS OF ARBITRARY TEST PATTERNS

BACKGROUND OF THE INVENTION

1. Field of Invention

The invention relates to an image quality analysis system and method that can perform any of a series of specific image quality analyses based on one or more test patterns to perform evaluation of printer and copier image quality automatically.

2. Description of Related Art

It is well known that customer satisfaction can be improved and maintenance costs reduced if problems with copiers and printers can be fixed before they become serious enough to warrant a service call by the customer. While current technology exists to enable printers and copiers to call for service automatically when sensors detect certain operating parameters outside of permissible ranges, there is not a very comprehensive manner of detecting incipient system failure or automatically diagnosing when problems with image quality reach a level where human observers perceive a reduction in quality. This is caused not only by the large number of operating parameters that would need to be tracked, but also because these parameters are strongly coupled to one another. That is, a given parameter at a certain value may or may not be a problem depending on the values of other parameters. While existing systems provide some level of image quality analysis, these systems have been found less than satisfactory as image quality determination is machine dependent and may be inconsistent with perceptions of image quality as judged by human users.

SUMMARY OF THE INVENTION

There is a need for image output devices, such as printers and copiers, to better self-diagnose problems relating to image quality. Applicants have found that to comprehensively and reliably measure the system performance of a printer or copier, the image quality of the output must be measured.

There also is a need for an image quality analysis system that can determine various aspects of image quality easily and with minimal user involvement and minimal user expertise. An automated image analysis system for printed output should ideally be able to handle an arbitrary test pattern without the need of human assistance to specify which test pattern or analysis sequence should be performed.

According to one aspect of the systems and method of the invention, these problems are solved by allowing the analysis to be controlled by a script, which in turn is selected based on information contained in an identifying label or marker that is decoded from a scan of a printed test sample. The identification label is preferably part of the digital input test pattern, and is in human-readable and/or machine-readable form. Besides assistance in controlling what analyses are to be performed, such a label can also be used to identify a particular machine that is being tested, and provide other relevant information.

Systems which can perform image analysis on printed test samples can be used in a variety of ways to provide solutions and value to users of digital printers and copiers, for example, as the analysis engine for automatic or remote diagnosis of print quality problems, or for monitoring image quality as part of a print quality assurance system.

The system, according to an aspect of the invention, uses a scanner, either a stand-alone or part of a multi-function printer/scanner/copier, to scan the printed test sample, and then perform a series of analyses on the scanned image using an image quality analysis module that may be built into the image output device being tested, or provided as a stand-alone component that can receive the output from the scanner. There are often a number of different test patterns that would be used depending on which print quality issues are being tested. It is therefore necessary to provide information to the analysis system about which test pattern has been scanned, and which analysis should be performed. This information could be provided manually by an operator, but that significantly reduces the value of the automated analysis.

BRIEF DESCRIPTION OF THE DRAWINGS

The invention will be described with reference to the following illustrative drawings, wherein like numerals refer to like elements and wherein:

FIG. 7 is an exemplary scripts file for the test pattern of FIG. 4 showing identification of various test elements, their position on the full-page test pattern, and image analyses to be performed.

DETAILED DESCRIPTION OF PREFERRED EMBODIMENTS

Figure 1:
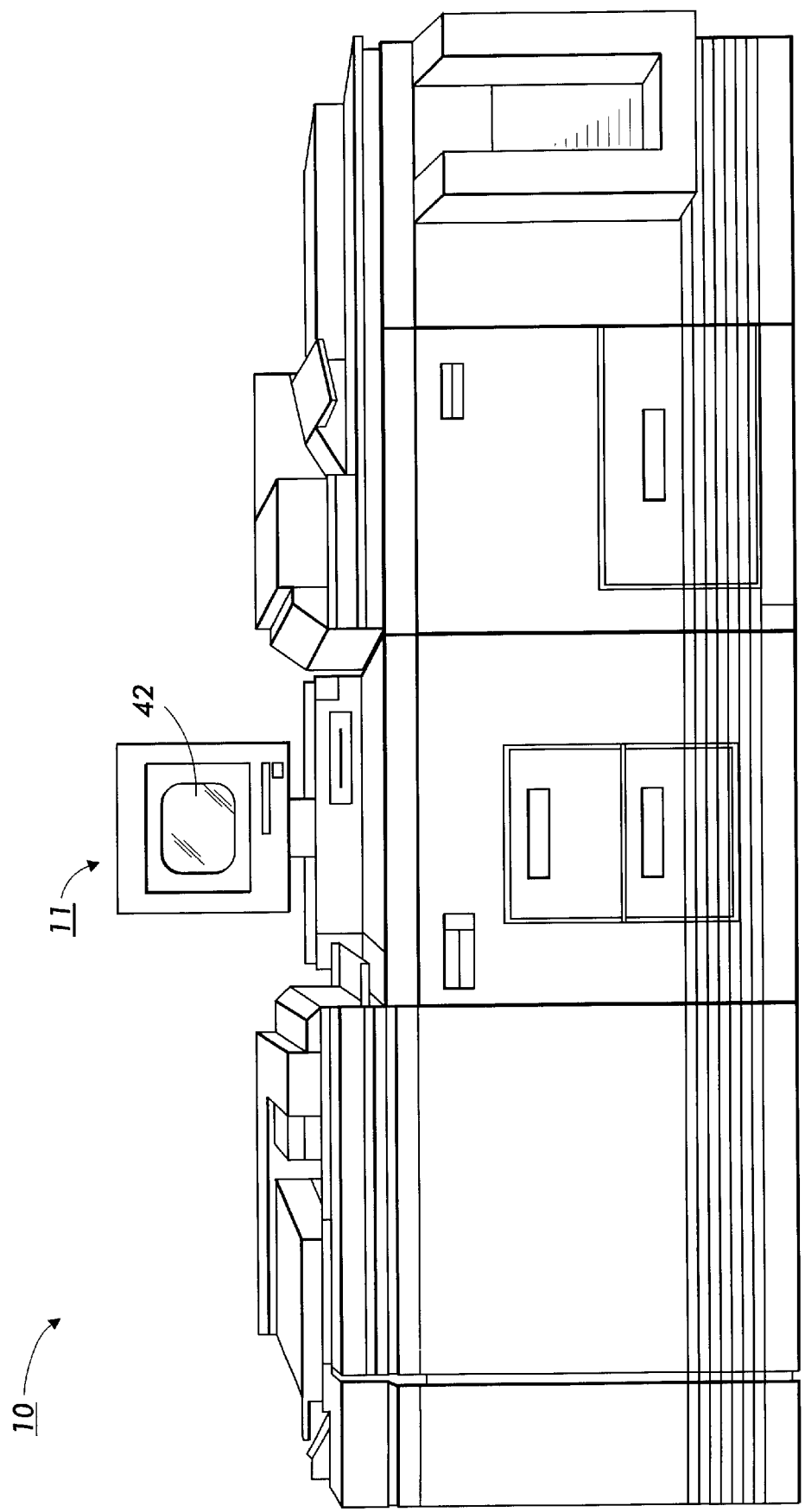
FIG. 1 shows a typical digital copier machine having a user interface suitable for use with the invention.

An exemplary device to which automatic image quality analysis is to be performed will be described with reference to FIGS. 1–3. FIG. 1 shows an image output device, in particular a digital copier machine 10, comprising a plurality of programmable components and subsystems which cooperate to carry out copying or printing jobs programmed through a touch dialog screen 42 of a user interface (UI) 11. Internal operating systems of the digital copier 10 are disclosed in U.S. Pats. Nos. 5,038,319, 5,057,866, and 5,365,310, owned by the assignee of the present invention, the disclosures of which are incorporated herein by reference in their entirety. As such, no further detailed description thereof is necessary. Digital copier 10, however, is merely representative of a preferred printing system to which the image quality determination is made. It should be understood that a loosely coupled printing or reproducing system is also applicable for use with the invention described herein, such as a printer or facsimile device. Moreover, while there may be benefits to use of the image quality analysis on a reproduction system, such as a digital copier having an integral scanner component, the invention also is applicable to a printer used in conjunction with a stand-alone scanner, such as a flatbed type scanner.

Figure 2:
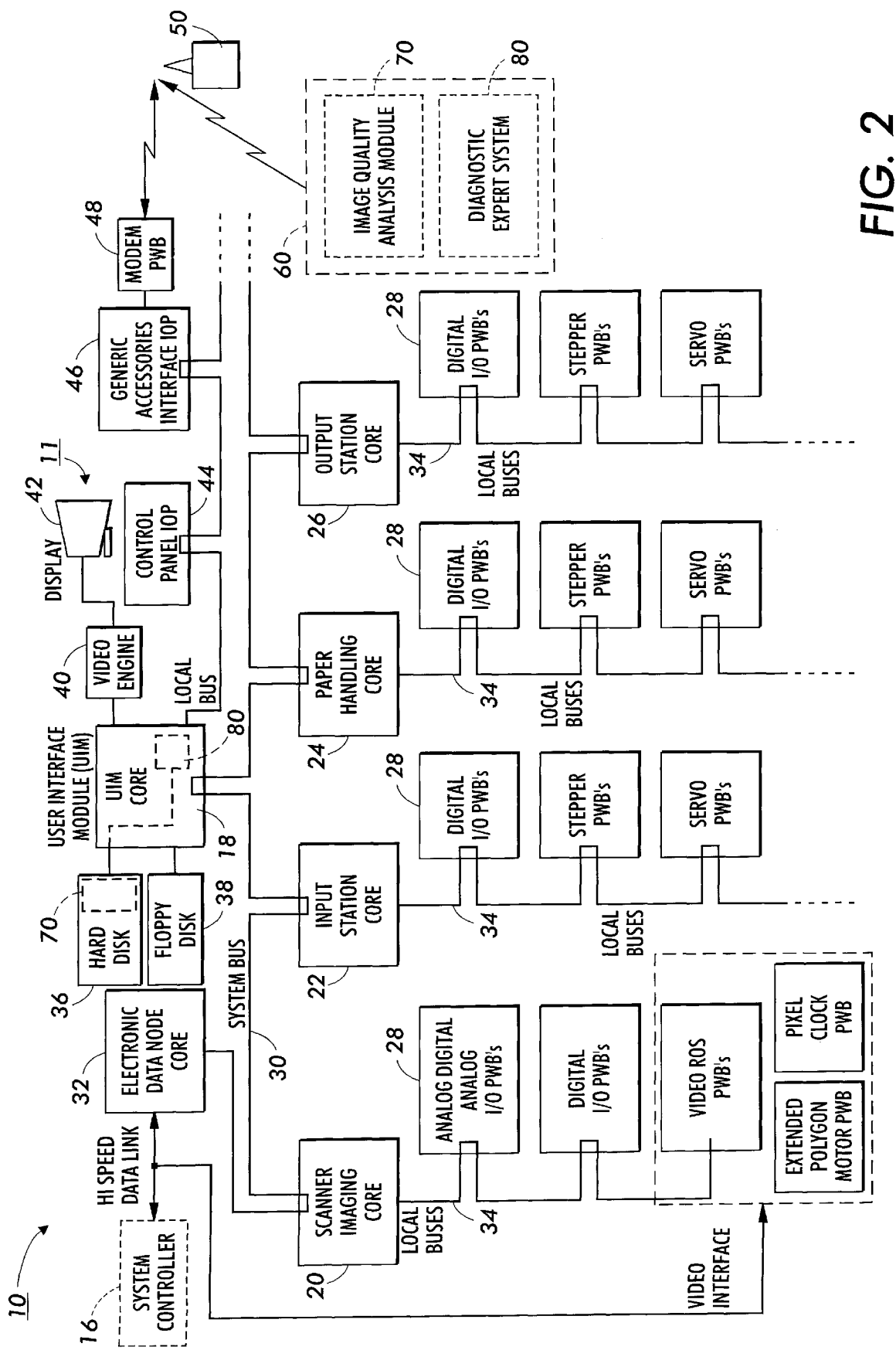
FIG. 2 is a schematic diagram of a digital copier having a user interface for communicating with a remote diagnostic computer.

Referring to FIG. 2, operation of the various components of exemplary digital copier 10 is regulated by a control system which uses operating software stored in memory in the system controller 16 to operate the various machine components in an integrated fashion to produce copies and prints. The control system includes a plurality of printed wiring boards (PWBs), there being a user interface module (UIM) core PWB 18, a scanner/imaging core PWB 20, an input station core PWB 22, a paper handling core PWB 24 and an output station core PWB 26, together with various input/output (I/O) PWBs 28. A shared line (SL) 30 couples the core PWBs 18, 20, 22, 24 and 26 with each other and with the electronic data node core 32, while local buses 34 serve to couple the PWBs to the respective cores and to stepper and servo PWBs. Programming and operating control over digital copier 10 is accomplished through touch dialog screen 42 of UI 11. The operating software includes application software for implementing and coordinating operation of system components.

Floppy disk port 38 provides program loading access to UIM core PWB 18 for the purpose of entering changes to the operating software, loading specific programs, such as diagnostic programs, and retrieving stored data, such as machine history data and fault data, using floppy disks. Hard disk 36 is used as a non-volatile memory (NVM) to store programs, machine physical data and specific machine identity information. One of the programs hard disk 36 may store is image quality analysis software that forms an image quality analysis module 70 used by the invention. Module 70 may also reside on a floppy disk used in floppy disk port 38.

UIM core PWB 18 communicates with video engine 40 for driving a suitable visual display 42, such as a CRT or flat screen of the user interface 11. The UIM core 18 also has connected thereto a control panel I/O processor 44 and a generic accessories interface I/O processor 46. The interface I/O processor 46 is in turn connected to a modem PWB 48. The modem 48 provides communication between digital copier 10 and a communications channel, such as a public switched telephone network 50 to facilitate information transfer to and from a remote diagnostic computer 60, which may also include image quality analysis module 70 as well as other diagnostic modules.

The information from the subsystem cores flows to and from the UIM core PWB 18, which embodies software control systems including a user interface system manager and a user interface manager. The UI system manager includes a UI display manager subsystem for controlling the display of messages on the display 42. A data manager subsystem provides data management to the UI system manager.

Figure 3:
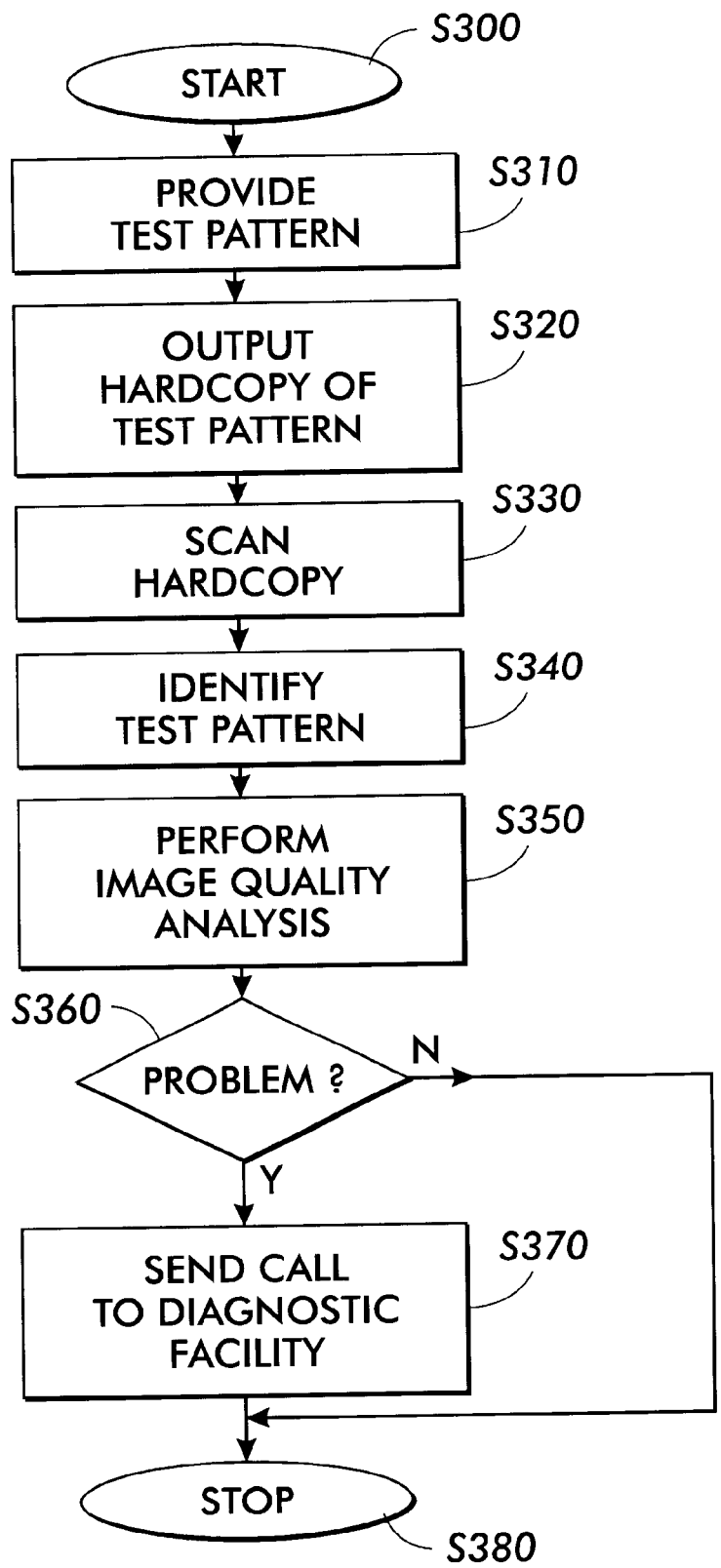
FIG. 3 is a flow chart showing an image analysis method according to the invention.
Figure 4:
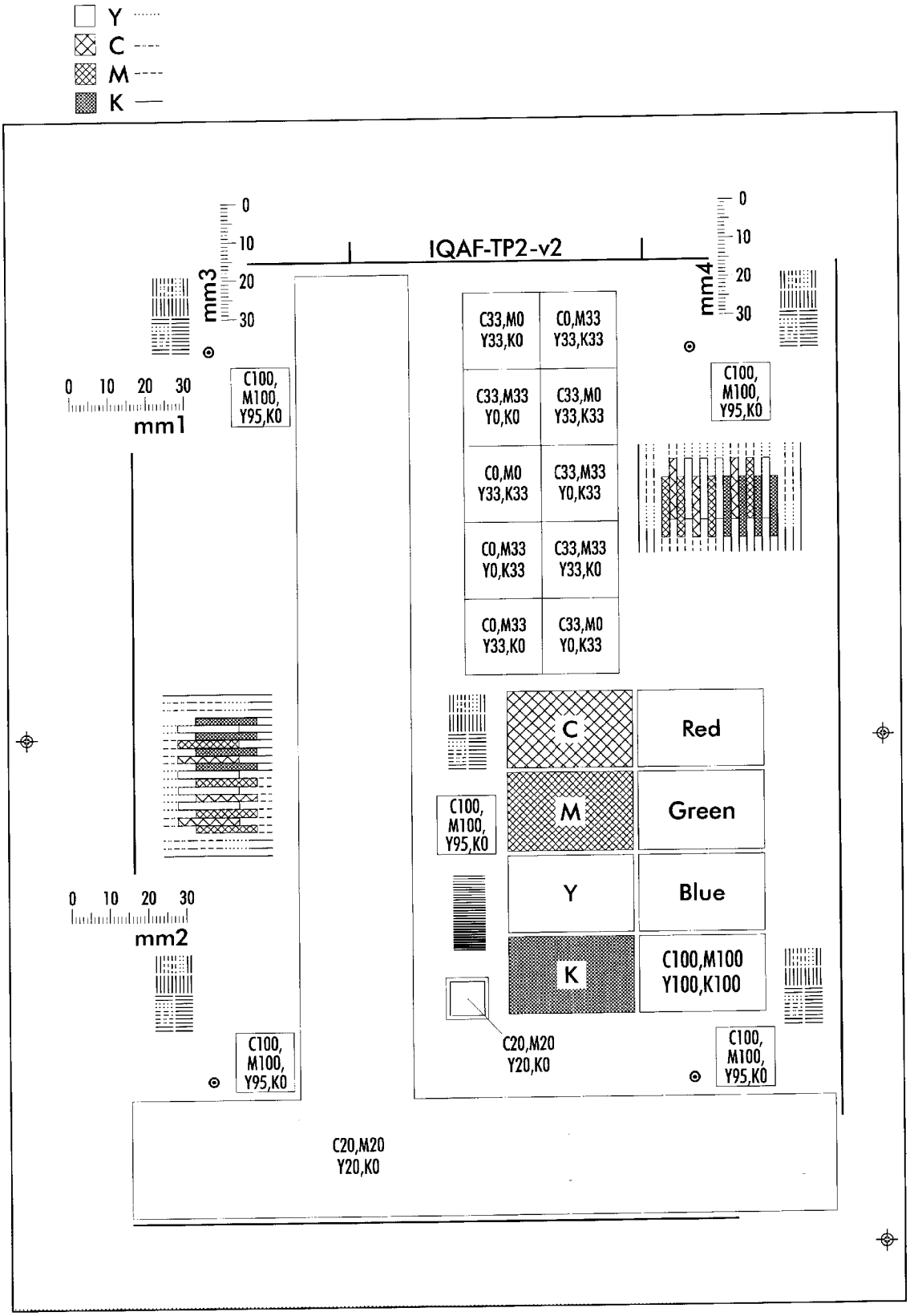
FIG. 4 is an exemplary full-page test pattern that can be used by the invention, and which includes regions suitable for many different types of image quality analysis, and which contains an identification label or mark which can identify the particular test pattern and script that should be used to control the analysis.

In a first embodiment of the invention, image quality analysis is performed by the process set forth in the flow chart of FIG. 3. The process starts at step S300 and advances to step S310 where at least one specific digital test pattern, which can either be in hardcopy original form or a digital image stored in memory 36, is provided. An exemplary test pattern is illustrated in FIG. 4 and will be described in more detail later. Each test pattern may contain regions which are suitable for analysis of several different aspects of image quality, and multiple different test patterns are used to completely cover all types of measurements relevant to a determination of image quality. Flow then proceeds to step S320 where a corresponding hardcopy output of the test pattern is generated. This can be by outputting a printed hardcopy output from output station 26 using the digital test pattern as an input when the test pattern is stored in digital form, such as in hard disk 36 or floppy disk 38. Alternatively, an accurate original hardcopy test pattern may be placed at scanner 20 and copied by the copier machine to form the hardcopy output. Then, flow advances to step S330 where the hardcopy output is scanned by scanner 20 to form a digital raster image for analysis purposes.

After step S330, flow advances to step S340 where the digital image is preferably acted on by pattern recognition software, which can be located within hard disk 36 or floppy disk 38 and is associated with image quality analysis module 70, to determine information which can be decoded to read an identification label or mark. This label points to a set of instructions, a "script", which tells the image analysis module how to analyze the scanned digital image. Alternatively, the label may itself contain the script. The image analysis module 70 includes a capability to decipher the particular encoded information from the test pattern. The memory of the image analysis module 70 may also be provided with script files corresponding to each possible label of encoded information. This script file details the contents of the associated test pattern, as well as details the sequence of image quality analysis routines to be applied to the scanned digital image. The script file and/or the label may also contain other relevant and useful information, such as test conditions, substrates and inks used, etc. A suitable script file is illustrated in FIG. 7.

After step S340, the process flows to step S350 where image quality analysis is performed on the test image using image quality analysis module 70 based on the detected script. In the case where the image quality analysis system is being used purely for image quality measurements, for example for quality assurance, the results from step S350 are provided to the user. Alternatively, in the case of machine diagnostics, from step S350, flow advances to step S360 where a determination is made by the image quality analysis module 70 whether the image quality for this particular test image is acceptable. If it is, flow advances to step S380 where the process stops. However, if the image quality is not acceptable, flow advances from step S360 to step S370 where a call can be made to a diagnostic facility. This call may be an automatic service call made through modem 48 for scheduling an actual service visit by a service technician to correct the noted problems. Alternatively, it may be a call to a more sophisticated diagnostic module 80 located locally or at the remote facility that can further analyze the image quality problem along with values from various sensors and settings on the copier 10. This would provide corrective feedback to the digital copier 10, such as through modem 48 when module 80 is remotely located, allowing the digital copier 20 to adjust itself within acceptable parameters.

Figure 6:
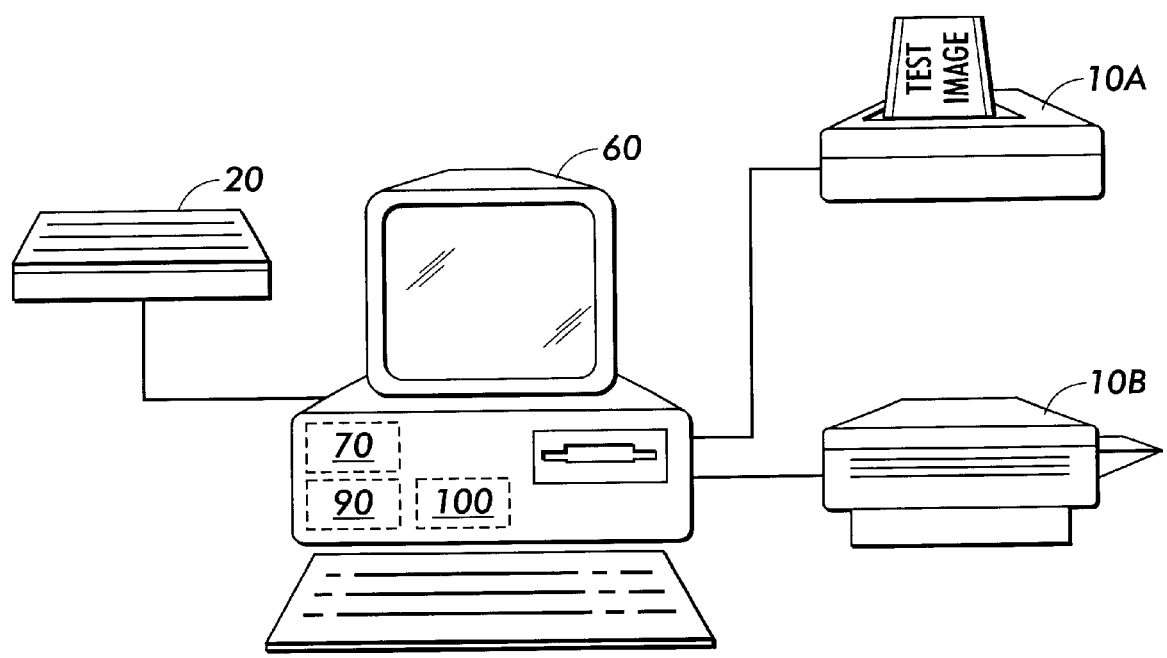
FIG. 6 is an alternative image output device and image analysis system according to the invention.

Alternatively, the image quality analysis module 70 may be remote from image output device 10. An example of which is illustrated in FIG. 6 where image output devices are in the form of printers 10A, 10B which are associated with a personal computer 60 through appropriate data cables. A flat bed scanner 20 is also associated with personal computer 60 and image quality analysis module 70 is in the form of software provided in personal computer 60. This embodiment operates as the previous embodiment in that the printers 10A, 10B (which ever is being tested) are given a test pattern to generate a hardcopy output from. This hardcopy output is then placed in scanner 20 to generate the digital test image. This digital test pattern is then analyzed to determine image quality of the printer.

While shown in FIG. 6 to be loosely associated, the invention can also be practiced with completely discrete components, such as a separate printer, scanner and computer or other source for containing image quality analysis module 70. In this case, the hardcopy output from the printer can be provided to a non-associated scanner for scanning. Then, the digital test image from the scanner can be stored or converted onto a portable recording medium, such as a floppy disk, and provided to a non-associated computer having the image quality analysis module for testing.

The test pattern used can be one of several test patterns designed to provide evaluation of particular parameters relevant to image quality of the output of the printing system, such as color registration, motion quality, micro and macro uniformity, color correction, and font quality. This overall analysis is performed using human perception modeling so that those differences that would be perceived by a human observer are determined. That is, rather than having the analysis merely compare a scanned image to an original or to determine some level of variation or deviation from a given norm that may or may not rise to the level of a perceived image quality issue when viewed by a human observer, the results of the image quality analysis are passed through human perception models based on human visual systems (HVS). At a simple level, this can be achieved by passing the image through a band-pass filter known to be similar in resolution to that achieved by a human visual system. More sophisticated modeling can also be used.

This particular invention relates specifically to identification of scripts which specify the contents of arbitrary test patterns and the sequence of analyses which should be performed For a more detailed description of the overall image quality analysis system, see co-pending U.S. Ser. No. (Atty. Docket No. 103059) to Rasmussen et al., filed concurrently herewith, entitled "Virtual Tech Rep By Remote Image Quality Analysis", the disclosure of which is incorporated herein by reference in its entirety.

The image quality analysis according to this invention is preferably performed with as much automation as possible to reduce the amount of human involvement with the process. In the case of a digital copier or reprographic machine, such as machine 10 having both an output station and a scanner station, analysis can be initiated automatically by the image quality analysis module 70, which can be stored within hard disk 36, for example. That is, the image quality analysis module 70 may operate as a self-executing program either initialized at start-up or after a predetermined period of use or number of copies made, such that module 70 causes a test pattern to be printed by output section 26 and then causes the hardcopy output therefrom scanned by scanner section 20. This can be achieved in an automated fashion, for example, by having the print output of the station 26 linked to the scanner station 20 input, as in U.S. Pat. No. 5,884,118 to Mestha et al., owned by the assignee of the present invention, the disclosure of which is incorporated herein by reference in its entirety. In this case, where the process is fully automated and initiated by the image analysis module itself, there is little or no need for detecting the script based on the scanned digital image.

However, an alternative situation is where the process has been initiated in such a way that the image analysis system does not have any means of knowing in advance which test pattern has been used or which analysis script should be applied. This can be the situation for example when the test pattern is provided in the form of an original hardcopy for testing a copier, or in the case where the image analysis system is loosely coupled, or not coupled at all, with the printer/copier being tested.

Figure 5:
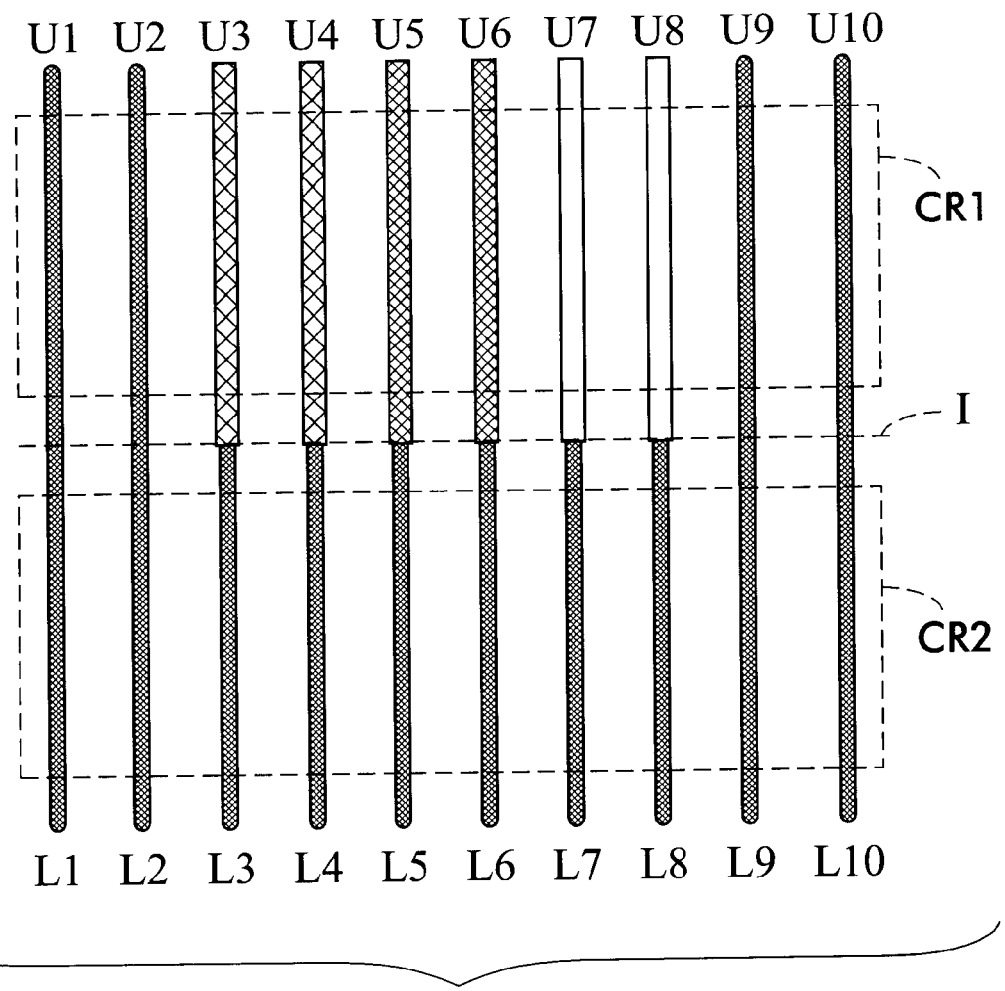
FIG. 5 is a region of the test pattern, shown in enlargement, which is used for one specific analysis.

The exemplary test pattern illustrated in FIG. 4 contains several different regions, each of which is suitable for analysis of one or more aspects of image quality. In particular it contains regions which are useful in determining color-color registration, in a color image output device that outputs using a CYMK color space, with C being Cyan, Y being Yellow, M being Magenta and K being Black. An enlargement of such a region is shown in FIG. 5. This test pattern, FIG. 4, is provided with encoded information, in the form of the text "IQAF-TP2-V2", that can further be associated with a script that completely specifies the sequence of analyses to be performed. The script, an example of which is illustrated in FIG. 7, specifies the location of different regions within the test pattern, and which image quality metrics to apply at each region. Each test pattern used with the invention can include similar encoded information which can be decoded and translated into a specification of which script should be applied to analyze the printed test sample. The simplest technique would be to write a script filename, in human-readable text, as part of the test pattern. A more advanced, and possibly more robust method, would use bar codes, glyphs, or similar encoding system for the encoded information.

Image quality analysis module 70 is associated with one or more of a bar code reader module 90, optical character recognition (OCR) module 100 or other suitable decipher software to decipher the encoded information identifying the script, which will be recreated when the input pattern is output as a hardcopy by the image output device 10 and subsequently formed into the digital raster image.

When the analysis system receives the digital scan (a raster image) of the printed test sample, the first action is to decode the encoded information to identify a script specification. In the case where human-readable text is used to specify the script, OCR module 100 can be used to translate the raster image to a filename that specifies the script. In the case of bar code information, bar code reader module 90 can be used to decipher the encoded information and determine the appropriate script file.

The analysis system performs analysis based on these "scripts", each of which, for example, could be stored in a file on a local data storage device (e.g., hard disk 36). This way, there could be any number of predefined scripts, and any number of scripts could be added by the user when required by the need for analysis of different print quality problems.

The decoded information is used to select one of several possible scripts. At the time of scanning, the scripts have already been defined, and there are therefore a limited number of scripts to choose between. A "dictionary" or database of possible script names can be built and provided within hard disk 36 of copier 10 (FIG. 2) or within computer 60 (FIG. 6), and used in conjunction with the decoding system in order to improve the robustness of the decoding. For example, in the case of OCR on plain text, the existing scripts would define a limited set of "words", preferably clearly distinguishable from each other, which would be acceptable outputs of the decoding system. In this way, the success rate of correctly interpreting the coding can be significantly increased.

Each script has associated therewith not only the type of test pattern used, but identification of specific image quality analysis to be performed. Automation in this manner eliminates the need for trained operators to specify or operate an analysis sequence. Thus, all the user needs to do is supply a particular script encoded test pattern to the image output device 10. This can be achieved in the context of testing one of the printers 10A, 10B in FIG. 6 by providing a digital test pattern as an input to the printer, which may be sent from personal computer 60 to printer 10A, 10B. Alternatively, when testing a multipurpose image input device having a scanning function, such as a facsimile or copier machine, the test pattern with encoded information may be provided as a hardcopy original, which is subsequently fed through the scanner to achieve an input that is printed by the printing section of the copier. This printed hardcopy output is then placed back into the scanner and scanned to form the digital raster image, which will include not only the test pattern, but also the encoded information identifying the relevant script. In such embodiments, the user does not need to know the specific details of the image analysis to be performed and only needs to manually input the test pattern for image quality monitoring.

Other test patterns can be provided, each with a particular unique encoded information for identification of a script. An exemplary test pattern and associated analysis suitable for determining pixel placement accuracy to a high precision can be found in co-pending U.S. Ser. No. (Atty. Docket No. 104706) to Dalal et al., filed concurrently herewith, entitled "Quantification of Motion Quality Effect on Image Quality", the subject matter of which is incorporated by reference herein in its entirety. Furthermore, a test pattern and analysis may be used to distinguish and categorize various non-uniformities. Such an exemplary analysis can be found in co-pending U.S. Ser. No. (Atty. Docket No. 104710) to Rasmussen et al., filed concurrently herewith, entitled "Image Processing Method for Characterization of Uniformity of Printed Images", the subject matter of which is incorporated by reference herein in its entirety. Other test patterns can be used to determine quality of font reproduction. An example of such can be found in co-pending U.S. Ser. No. (Atty. Docket No. 104728) to Rasmussen et al., filed concurrently herewith, entitled "Outline Font For Analytical Assessment of Printed Text Quality", the subject matter of which is incorporated by reference herein in its entirety.

The systems and methods described above are concerned with automating the tasks of specifying test pattern and analysis sequence. However, there are other applications that can be accomplished with a similar method.

When print samples are analyzed based on images recorded with RGB scanners, it is usually necessary to apply a color calibration procedure in order to convert the scanned image into a standard color space (e.g., CIELab). The color calibration depends not only on the scanner, but also on the printer materials (substrates and toners or inks). When the image quality analysis system is used in an environment with different printers and/or materials, there is a need to apply different color calibration data depending on the printer/materials. This would typically involve a manual step for specifying this information. However, the printed test samples can be annotated to indicate the specific printer/materials and using the method described above to decode the information and use it to automatically select the correct calibration data.

Also, when the application of the image quality analysis system is for print quality monitoring, for example, it is typically necessary that each print sample that is being analyzed is identified in a unique manner that would allow the results of the analysis to be tied to that particular print sample. Such an identification could, for example, include a specification of which printer the sample originated from and date and time information. Using, for example OCR methods, such information can be recorded automatically and associated with the analysis results.

The present invention has been described with reference to specific embodiments, which are intended to be illustrative and non-limiting. Various modifications can be made to the invention without departing from the spirit and scope of the invention as defined by the appended claims.

What is claimed is:

1. A method of performing image quality analysis on an image output device having an output station that generates a hardcopy image output from an input image, the method comprising:

providing a test pattern that may not be known in advance by an image quality analysis module, the test pattern being embedded with encoded information identifying the particular test pattern;

generating a hardcopy image output from the image output device using the test pattern as an input image;

scanning the hardcopy image to form a digital raster image;

decoding the encoded information to identify the particular test pattern and identify which of several types of image quality analysis routines is to be performed; and performing the selected image quality analyses on appropriate regions of the digital raster image using the an image quality analysis module to evaluate image quality performance of the image output device, wherein the image quality analysis module can analyze the test pattern without knowing in advance particulars of the test pattern or which image quality analyses to perform by decoding the encoded information found on the test pattern.

2. The method of claim 1, wherein the encoded information is in the form of human readable words.

3. The method of claim 2, wherein the step of decoding includes performing optical character recognition on the encoded information.

4. The method of claim 1, wherein the encoded information is in the form of a barcode.

5. The method of claim 4, wherein the step of decoding includes reading the barcode with a bar code reader.

6. The method of claim 1, wherein scripts are stored in memory for each test pattern, and the encoded information includes identification of the relevant script, which contains information relating to an image quality analysis routine to be performed when analyzing the particular test pattern.

7. The method of claim 1, wherein the test pattern is in digital form.

8. The method of claim 1, wherein the test pattern is a hardcopy original.

9. The method of claim 1, wherein specific printer/materials data are provided in the encoded information and the image quality analyses automatically select correct calibration data based on the specific printer/materials data.

10. The method of claim 1, wherein the selected image quality analyses include at least one of color registration, motion quality, micro uniformity, macro uniformity, color correction and font quality.

11. An image quality analysis system for performing image quality analysis on an image output device that generates a hardcopy image output from an input image, the system comprising:

a arbitrary test pattern that may not be known in advance by an image quality analysis module, the test pattern being embedded with encoded information identifying the particular test pattern;

a scanner that forms a digital raster image from a hardcopy image output from an image output device to be tested that used the test pattern as an input image;

a decoder that decodes the encoded information to identify the particular test pattern and identify which of several types of image quality analysis routines is to be performed; and the image quality analysis module that performs image quality analysis on the digital raster image based on the decoded information to evaluate image quality performance of the image output device, wherein the image quality analysis module can analyze the test pattern without knowing in advance particulars of the test pattern or which image quality analyses to perform by decoding the encoded information found on the test pattern.

12. The system of claim 11, wherein the encoded information contains human readable words.

13. The system of claim 12, wherein the decoder is an optical character recognition device.

14. The system of claim 11, wherein the encoded information is in the form of a barcode.

15. The system of claim 14, wherein the decoder is a barcode reader.

16. The system of claim 11, wherein scripts are stored in memory for each test pattern, and the encoded information includes identification of the relevant script, which contains information relating to an image quality analysis routine to be performed when analyzing the particular test pattern.

17. The system of claim 16, wherein the scripts are in the form of self-executing subroutines that automatically perform the one image quality analysis on the digital raster image.

18. The system of claim 17, wherein the test pattern includes identification of the image output device being tested.

19. The system of claim 11, wherein the encoded information indicates specific printer/materials data useful in the image quality analysis to automatically select correct calibration data.

20. The system of claim 11, wherein the image quality analysis module performs analysis of at least one of color registration, motion quality, micro uniformity, macro uniformity, color correction and font quality.

* * * * *